(12) United States Patent
Lehr (10) Patent No.: US 11,135,662 B2
(45) Date of Patent: Oct. 5, 2021

(54) MOTOR-OPERATED SHEARS

(71) Applicant: GUSTAV KLAUKE GMBH, Remscheid (DE)

(72) Inventor: Andreas Lehr, Neuss (DE)

(73) Assignee: GUSTAV KLAUKE GMBH, Remscheid (DE)

(*) Notice: Subject to any disclaimer, the term of this patent is extended or adjusted under 35 U.S.C. 154(b) by 183 days.

(21) Appl. No.: 16/071,272

(22) PCT Filed: Jan. 9, 2017

(86) PCT No.: PCT/EP2017/050332
§ 371 (c)(1),
(2) Date: Jul. 19, 2018

(87) PCT Pub. No.: WO2017/125272
PCT Pub. Date: Jul. 27, 2017

(65) Prior Publication Data
US 2020/0061724 A1 Feb. 27, 2020

(30) Foreign Application Priority Data

Jan. 20, 2016 (DE) .................... 10 2016 100 940.7

(51) Int. Cl.
*B23D 17/06* (2006.01)
*B23D 35/00* (2006.01)

(52) U.S. Cl.
CPC .......... *B23D 17/06* (2013.01); *B23D 35/001* (2013.01); *B23D 35/005* (2013.01)

(58) Field of Classification Search
CPC .. B23D 17/00–08; B23D 29/00; B23D 35/00; B23D 35/01; B23D 35/02; B23D 35/005; B26B 15/00; A62B 3/005

USPC .......................................................... 30/228
See application file for complete search history.

(56) References Cited

U.S. PATENT DOCUMENTS

| 4,369,576 A | * | 1/1983 | McVaugh | B23D 17/06 30/228 |
| 4,506,445 A | | 3/1985 | Esten | |
| 5,243,761 A | * | 9/1993 | Sullivan | B23D 17/06 30/134 |

(Continued)

FOREIGN PATENT DOCUMENTS

| DE | 29507457 | 8/1995 | | |
| DE | 102016100940 A1 | * | 7/2017 | ............. B23D 17/06 |

(Continued)

OTHER PUBLICATIONS

International Search Report for corresponding international patent application No. PCT/EP2017/050332 dated Apr. 12, 2017, 4 pages.

(Continued)

*Primary Examiner* — Jason Daniel Prone
(74) *Attorney, Agent, or Firm* — Klintworth & Rozenblat IP LLP (57) ABSTRACT

A motor-operated shears which includes two blades that can move towards each other to perform a shearing movement is provided. In order to advantageously improve functional safety, towards the end of the movement, the blades are acted upon in a direction running transversely to the movement so as to keep the blades at a distance from one another in said direction.

10 Claims, 11 Drawing Sheets

(56) References Cited

U.S. PATENT DOCUMENTS

| | | | | |
|---|---|---|---|---|
| 5,645,236 A | * | 7/1997 | Sugiura | B23D 17/06 |
| | | | | 241/266 |
| 5,769,341 A | * | 6/1998 | Morikawa | B23D 17/00 |
| | | | | 241/266 |
| 7,412,868 B2 | | 8/2008 | Frenken | |
| 7,937,838 B2 | * | 5/2011 | Patton | B23D 35/002 |
| | | | | 30/228 |
| 8,684,292 B2 | * | 4/2014 | Ramun | A62B 3/005 |
| | | | | 241/101.73 |
| 9,227,254 B2 | * | 1/2016 | Westley | B23D 17/06 |
| 9,849,524 B2 | * | 12/2017 | Lawlor | B23D 29/00 |
| 2018/0178045 A1 | * | 6/2018 | Maarschalk | B23D 29/00 |
| 2018/0345473 A1 | * | 12/2018 | Zhou | B25F 5/005 |
| 2019/0255631 A1 | * | 8/2019 | Tischler | B23D 35/002 |
| 2020/0055130 A1 | * | 2/2020 | D'Antuono | B23D 17/00 |
| 2020/0094332 A1 | * | 3/2020 | Kimura | A62B 3/005 |
| 2020/0198116 A1 | * | 6/2020 | Skrobot | B23D 17/04 |
| 2020/0269410 A1 | * | 8/2020 | Frenken et al. | B25F 5/021 |
| 2020/0282481 A1 | * | 9/2020 | Lehr et al. | B23D 17/06 |

FOREIGN PATENT DOCUMENTS

| | | | | |
|---|---|---|---|---|
| GB | | 2405117 | 2/2005 | |
| WO | | 2003/084719 | 10/2003 | |
| WO | | 2006/065113 | 6/2006 | |
| WO | WO-2017125272 A1 | * | 7/2017 | B23D 17/06 |

OTHER PUBLICATIONS

Written Opinion for corresponding international patent application No. PCT/EP2017/050332 dated Apr. 12, 2017, 4 pages.
Machine translation for DE29507457U1.
Machine translation for WO2003084719A2.

* cited by examiner

MOTOR-OPERATED SHEARS

TECHNICAL FIELD

The invention pertains to motor-operated shears with two blades that can be moved relative to one another in order to carry out a shearing movement.

PRIOR ART

Shears of this type are known. We refer, e.g., to DE 295 07 457 U1. The shears described and illustrated in this publication can be actuated hydraulically, wherein the hydraulic pressure can be built up electrically. A piston that can be acted upon with hydraulic medium acts upon the blades, which can be moved relative to one another, via a piston rod such that these blades can be displaced from a home position of the shears into a cutting position and back into the home position. The two blades can be respectively pivoted about fixed axle bodies of the device.

In conventional designs of such shears, the blades or the cutting jaws forming the blades flatly adjoin one another over at least part of their extent in the region of a cutting plane. In this respect, it is furthermore known to design the blades in such a way that they are guided past one another in the cutting plane during the course of a cutting process.

When cutting materials to be cut such as cable harnesses, it can occur that part of the material to be cut, e.g. part of the cable harness, gets jammed between the blades toward the end of the cutting process, wherein the blades are simultaneously spread apart in a direction extending transversely to the cutting movement of the blades. If applicable, the cutting process can therefore not be successfully completed. The occurring jamming effect can also impair the return of the blades into the home position of the shears, particularly a conventional spring return or, if applicable, an automatic motor-driven return.

SUMMARY OF THE INVENTION

In light of the known prior art, the invention aims to solve the technical problem of enhancing the functional reliability of motor-operated shears of the type in question.

According to a first inventive idea, a potential solution to this problem is achieved with shears, in which the blades are toward the end of the movement acted upon in a direction extending transversely to the movement in order to space the blades apart from one another in this direction.

Accordingly, the blades or the jaws featuring the blades are toward the end of the cutting process intentionally acted upon in a direction extending transversely to the cutting movement, preferably transversely to a cutting plane, such that the blades are spaced apart from one another due to this action. Satisfactory cutting results can be achieved with thusly designed shears. An impediment of the blades with respect to their return into the home position of the shears, particularly as a result of jamming of regions of the material to be cut, is counteracted.

The action may be realized in such a way that at least one of the two blades is spaced apart from the cutting plane, which is defined by the two blades during the cutting process. However, the action may also cause both blades to be spaced apart from the cutting plane, if applicable by the same distance.

In a preferred embodiment, the spacing of one or both blades toward the end of the cutting process is once again canceled as the blades are displaced in the direction of the home position of the shears (open blade position) such that these blades can once again move past one another in a common cutting plane.

It is also preferred that the return of one or both blades into the common cutting plane can be exclusively realized by discontinuing the corresponding action upon the blades for spacing said blades apart from one another.

Other characteristics of the invention are described below, as well as in the description of the figures, frequently in their preferred association with the object of claim 1 or with characteristics of other claims. However, they may also be respectively significant in association with only individual characteristics of claim 1 or the respective other claim or independently.

It would furthermore be conceivable that the blades are acted upon so as to be spread apart starting from a rotational axis of the blades. The blade, particularly the cutting surface extending in the cutting plane during the course of a cutting process, may with respect to a cut in a plane extending perpendicular to the cutting plane include an acute angle with the cutting plane at least starting from the rotational axis in the direction of a free end of the blade. In this respect, the acute angle may amount to a few angular degrees, e.g. from 0.5° up to 3°; the acute angle may furthermore amount, e.g., to about 1.5-2°.

If both blades are simultaneously acted upon so as to be spread apart toward the end of the cutting process, the blades may according to another preferred embodiment include the same angles with the cutting plane, but alternatively also different acute angles.

In an alternative embodiment, the blades are acted upon over their length extending transversely to the rotational axis in order to be spaced apart from one another, as well as from the cutting plane, in a parallel manner. In this case, at least one blade or one cutting jaw is accordingly displaced as a whole in a direction extending transversely to the cutting plane, preferably perpendicular to the cutting plane. In this respect, it would also be conceivable to correspondingly act upon both cutting jaws, preferably in opposite directions that extend away from one another.

The blades can also be acted upon in a superimposed manner in order to be spread and spaced apart parallel to one another. In this case, the blades are toward the end of the cutting process in a position and alignment, in which at least one blade is spaced apart from the cutting plane perpendicular thereto and the cutting surface includes an acute angle with the cutting plane referred to a vertical section.

In a preferred embodiment, the blades may be mounted so as to be rotatable about a common axle body. During the course of a cutting process, both blades rotate toward one another and past one another in the cutting plane about the common rotational axis. The common axle body may be acted upon in order to space apart the blades. In this case, the axle body carrying the blades is preferably acted upon in order to thereby spread apart the blades and/or space apart the blades parallel to one another. The axle body can preferably be acted upon mechanically.

In a potential embodiment, the axle body can be elastically bent, preferably from a straight rod-shaped home position, in order to space apart the blades. The blades guided on the axle body are spread apart as a result of bending the axle body in the direction of its longitudinal extent.

Due to corresponding elastic material properties, the axle body preferably is automatically returned from the bent position after the discontinuation of the load acting upon the axle body. In order to spread apart the blades, e.g. by 0.5-3° relative to the cutting plane, it may suffice to bend the axle body in such a way that the geometric axis of the axle body (rotational axis) is displaced in the central region of the longitudinal extent of the axle body between a few tenths of a millimeter and up to 2 mm, preferably while the respective ends of the axle body are fixed on the shear base body. In this way, the geometric axis of the axle body extends in an arc-shaped manner in the position under load.

The blades can be acted upon by an extendable plunger. The plunger can preferably form part of a displaceable piston or a part, particularly a rigid part, that is connected to the piston. Furthermore, the plunger may also be individually displaceable relative to such fixing points by means of a motor such as an electric motor, e.g. via a spindle drive, in order to displace the blades from the home position of the shears into a cutting position and back into the home position. If applicable, the plunger may also be displaced by means of an (electric) motor with the aid of a hydraulic medium that acts upon a piston displacing the plunger.

The blades can preferably be acted upon by the plunger directly or indirectly in order to be spaced apart from one another. For example, the plunger may act upon a common axle body in such a way that this axle body is bent toward the end of the cutting process.

The blades may also be indirectly acted upon by the plunger, e.g. in that a section, which spaces apart at least one blade from the cutting plane and/or from the other blade, is pivoted into the region of the cutting plane toward the end of the cutting process.

In a potential embodiment, the plunger may also directly act upon the blades in such a way that the blades are spaced apart, particularly spaced apart in a parallel manner, toward the end of the cutting process. For example, the plunger may be inserted between the blades in the cutting plane in a wedge-like manner.

In another preferred embodiment, the blades are driven by the plunger via connecting rods in order to carry out a shearing movement. The connecting rods may be coupled to the plunger or to an extension arm of the plunger with one end and act upon a connecting rod arm of a cutting jaw featuring the blade with the other end. The coupling to the connecting rod arm can preferably be spaced apart from the blade transversely to the rotational axis thereof.

With respect to the disclosure, the ranges or value ranges or the multiple ranges indicated above and below also include all intermediate values, particularly in 1/10 increments of the respective dimension or, if applicable, also dimensionless. For example, the indication of 0.5-3° also includes the disclosure of 0.6-3°, 0.5-2.9°, 0.6-2.9°, etc., and the indication of 0.5-3 mm also includes the disclosure of 0.6-3 mm, 0.5-2.9 mm, 0.6-2.9 mm, etc. This disclosure may on the one hand serve for defining the lower and/or upper limits of a cited range, but alternatively or additionally also for disclosing one or more singular values in a respectively indicated range.

BRIEF DESCRIPTION OF THE DRAWINGS

The invention is described in greater detail below with reference to the attached drawings that merely show exemplary embodiments. A component, which is only described with reference to one of the exemplary embodiments and in another embodiment not replaced with a different component due to its specific characteristics, is therefore also described as a potentially existing component in this other exemplary embodiment. In the drawings.

DESCRIPTION OF THE EMBODIMENTS

Shears 1 with two blades 2, 3 that can be moved, particularly pivoted, relative to one another in order to carry out a shearing movement are initially described below with reference to FIG. 1.

According to the exemplary embodiments, the shears 1 can preferably be designed in the form of a working head of a base unit 5 that is not illustrated in greater detail. Such a base unit may consist, for example, of a base unit of the type illustrated and described in WO 2003/084719 A2 (U.S. Pat. No. 7,412,868 B2). With respect to the function and operation of such a base unit, particularly in connection with a working head such as the shears 1, we respectively refer to the complete content of the aforementioned WO or US publication, namely also for the purpose of integrating characteristics regarding the design of the base unit, which are described in the respective WO or US publication, into claims of the present application.

The shears 1 are connected mechanically and preferably also hydraulically to the schematically illustrated base unit 5 by means of a flange 4. To this end, the flange 4 is initially designed for being screwed to a neck 6 of the base unit 5. The neck 6 simultaneously forms a cylinder 7 for a piston 8 of the shears 1. The interacting region between the shears 1 and the base unit 5 is generally designed rotationally symmetrical to an axis y.

The flange 4 of the shears 1 comprises the neck 6 and transforms into an approximately U-shaped bracket 9 on the shear side of the neck 6. The U-opening points away from the flange 4.

An axle body 10 is mounted in the region of the free ends of the parallel U-limbs, which are preferably aligned in the direction of the axis y. The geometric axis of this axle body forms a rotational axis x that extends transversely to the shear axis y.

Two cutting jaws 11 and 12 featuring the blades 2 and 3 are mounted on the axle body 10 between the U-limbs of the bracket 9, which are spaced apart from one another in the direction of the axis x, so as to be pivotable about said axle body.

In the first exemplary embodiment illustrated in FIGS. 1-6, the cutting jaws 11 and 12 can preferably be held between the U-limbs of the bracket 9 such that a linear displacement of a cutting jaw 11, 12 along the rotational axis x is counteracted.

Each cutting jaw 11 and 12 initially contains a bore 13, through which the axle body 10 extends. Starting from the region of the bore 13, a cutting arm 14, 15, which respectively features the blade 2 or 3, essentially extends in the direction pointing away from the bracket 9. Starting from the region of the bore 13, each cutting jaw 11 and 12 features a respective actuating arm 16 or 17 that extends in the direction of the flange 4.

The facing surfaces of the cutting jaws 11 and 12 have a flat shape, particularly in the region of the cutting arms 14 and 15, and abut on one another such that the blades 2 and 3 can be guided past one another during the course of a cutting process.

Figure 1:
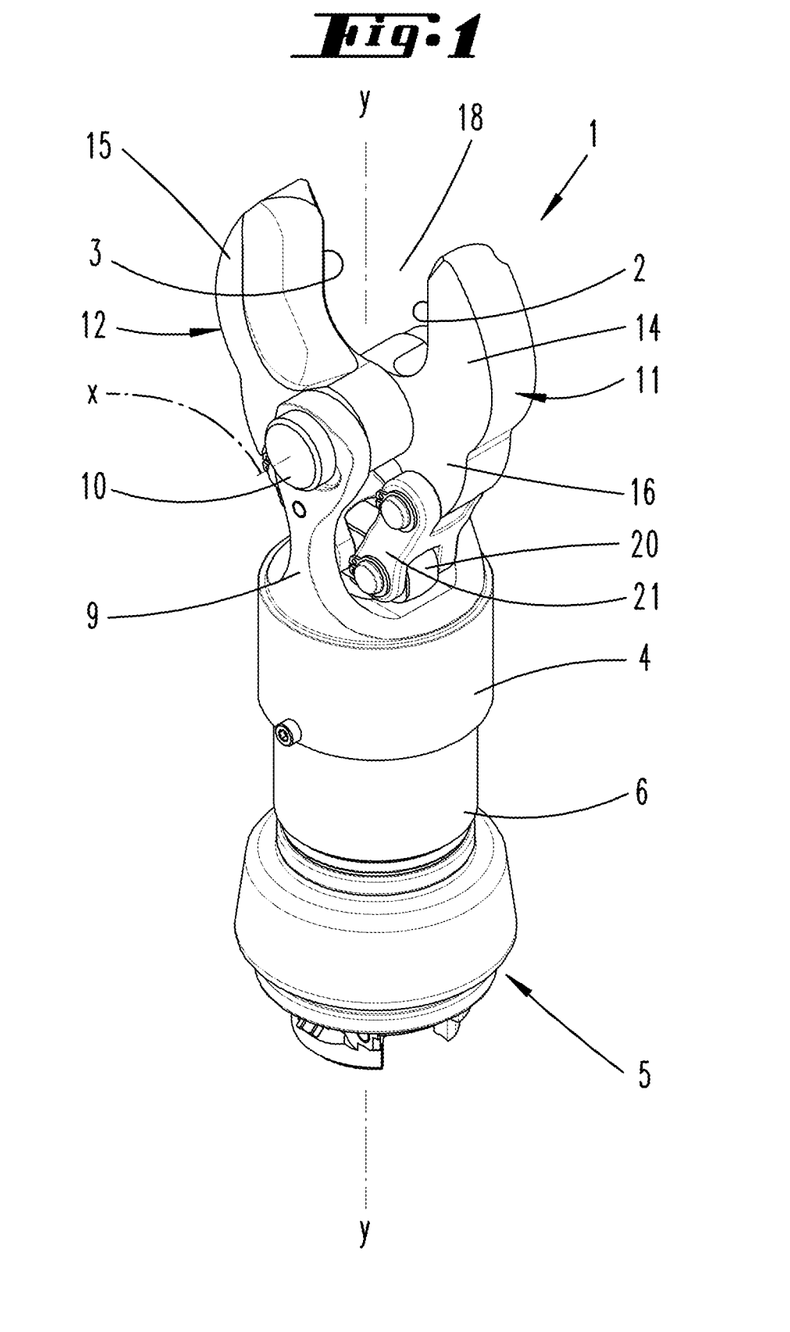
FIG. 1 shows a perspective representation of shears that concerns a first embodiment.
Figure 2:
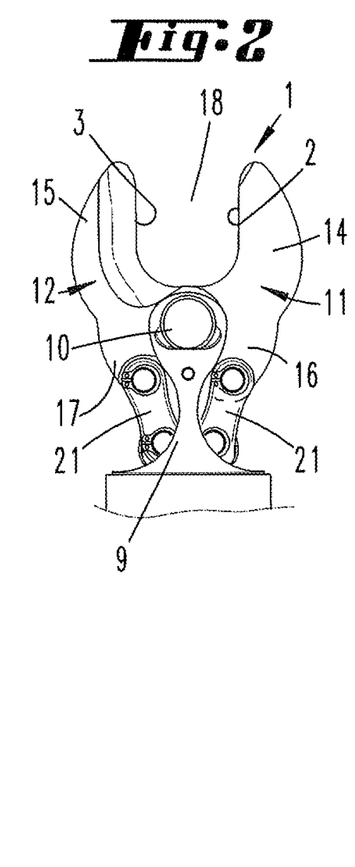
FIG. 2 shows the region of the blades of the shears in a home position thereof.
Figure 3:
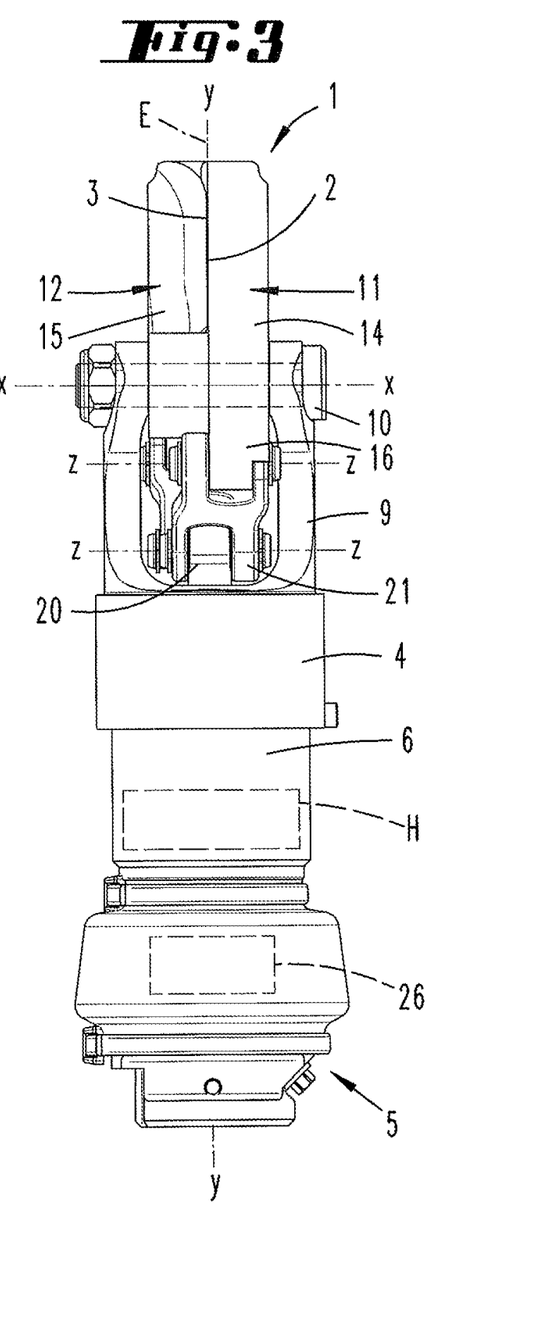
FIG. 3 shows a side view of the shears in the position according to FIG. 2, in which the plane of the drawing is aligned perpendicular to a plane of section.

The blades 2 and 3, which are spaced apart from one another in a home position according to FIGS. 1-3 and leave open a cutting opening 18 in a home position of the shears illustrated, e.g., in FIG. 2, are guided past one another during the course of a cutting process, namely within a cutting plane E.

The cutting plane E preferably extends such that it includes the shear axis y, wherein it is furthermore preferred that the rotational axis x is aligned perpendicular to the cutting plane E. The illustration in FIG. 5, in particular, shows that the cutting plane E extends between the abutting cutting jaws 11, 12 or blades 2, 3.

The piston 8 is connected to a plunger 19 that centrally extends through the flange 4 in the direction of the axis y. On its end, this plunger may carry one or preferably two rigid tabs 20 that are essentially aligned transversely to a direction of displacement of the piston 8.

Connecting rods 21 are rotatably mounted on the tabs 20, wherein the ends of said connecting rods lying opposite of the tabs 20 interact with actuating arms 16 and 17 of the cutting jaws 11 and 12 in an articulated manner.

The corresponding rotational axes z on the respective ends of the connecting rods 21 extend spatially parallel to the rotational axis x of the axle body 10.

The coupling points between the connecting rods 21 and the actuating arms 16, 17 are radially spaced apart from the rotational axis x. This results in a lever arm.

The respective displacement of the blades 2 and 3 or the cutting jaws 11 and 12 from the home position of the shears for cutting a material to be cut takes place due to a pressure increase in the chamber of the cylinder 7, particularly by pumping a hydraulic medium H into the chamber of the cylinder 7 such that the piston 8 with its plunger 19 is linearly displaced against the force of a return spring 22 surrounding the plunger 19. Due to the articulation (tab-connecting rod-actuating arm), the cutting jaws 11 and 12 are pivoted toward one another about the rotational axis x while the facing surfaces featuring the blades 2 and 3 slide on one another.

Toward the end of the cutting process, the plunger 19 acts upon the axle body 10 directly or preferably indirectly via the tabs 20 such that this axle body 10 bends on the bracket 9, which continues to hold the ends of the axle body 10. The axle body 10 can be elastically bent, preferably from a straight rod-shaped home position, in order to space apart the blades 2 and 3. The blades 2 and 3 guided on the axle body 10 are spread apart as a result of bending the axle body 10 in the direction of its longitudinal extent. FIG. 6 shows the preferred indirect action. FIG. 6 shows the tabs 20 engaging with the eye of the cutting jaws 11 and 12 that features the bore 13 which provides a load on the cutting jaws 11 and 12, thereby bending the axle body 10 which extends through the cutting jaws 11 and 12. When the axle body 10 is bent, the blades 2 and 3 are spread apart starting from the rotational axis x or starting from the axle body 10 (see FIG. 5). According to the illustration in FIG. 5, the corresponding rotational axis x may under this action extend in a convex arc shown by the angle α between the facing cutting surfaces of the cutting jaws 11 and 12, and viewed from the direction of the base unit 5. The angle α may be a few tenths of a degree, e.g. from 0.5° up to 2 or 3°. Under this load, an offset dimension a of a few tenths of a millimeter, for example between 0.1-0.5 mm and up to 1 or 2 mm, of an axis point, which respectively lies in the intersecting point of the rotational axis x and the axis y or the rotational axis x and the cutting plane E, may be adjusted relative to the intersecting point in the no-load position.

The action upon the axle body 10 may take place directly. However, the corresponding figures show a preferred indirect action via the eye of the cutting jaws 11 and 12 that features the bore 13 (see FIG. 6).

Figure 5:
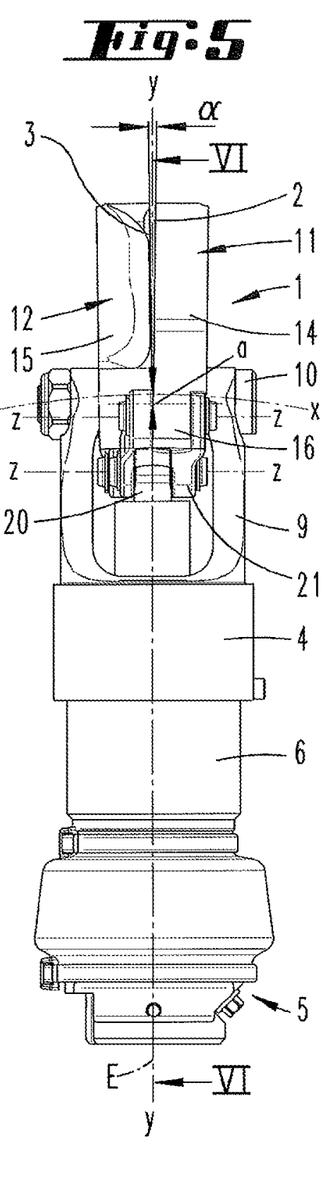
FIG. 5 shows a representation that corresponds to FIG. 3 and concerns the position according to FIG. 4.
Figure 6:
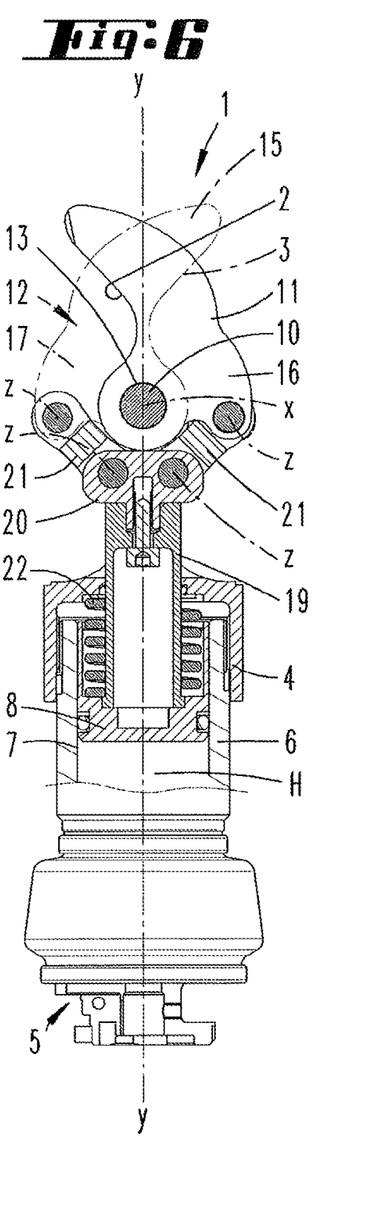
FIG. 6 shows the section along the line VI-VI in FIG. 5.
Figure 7:
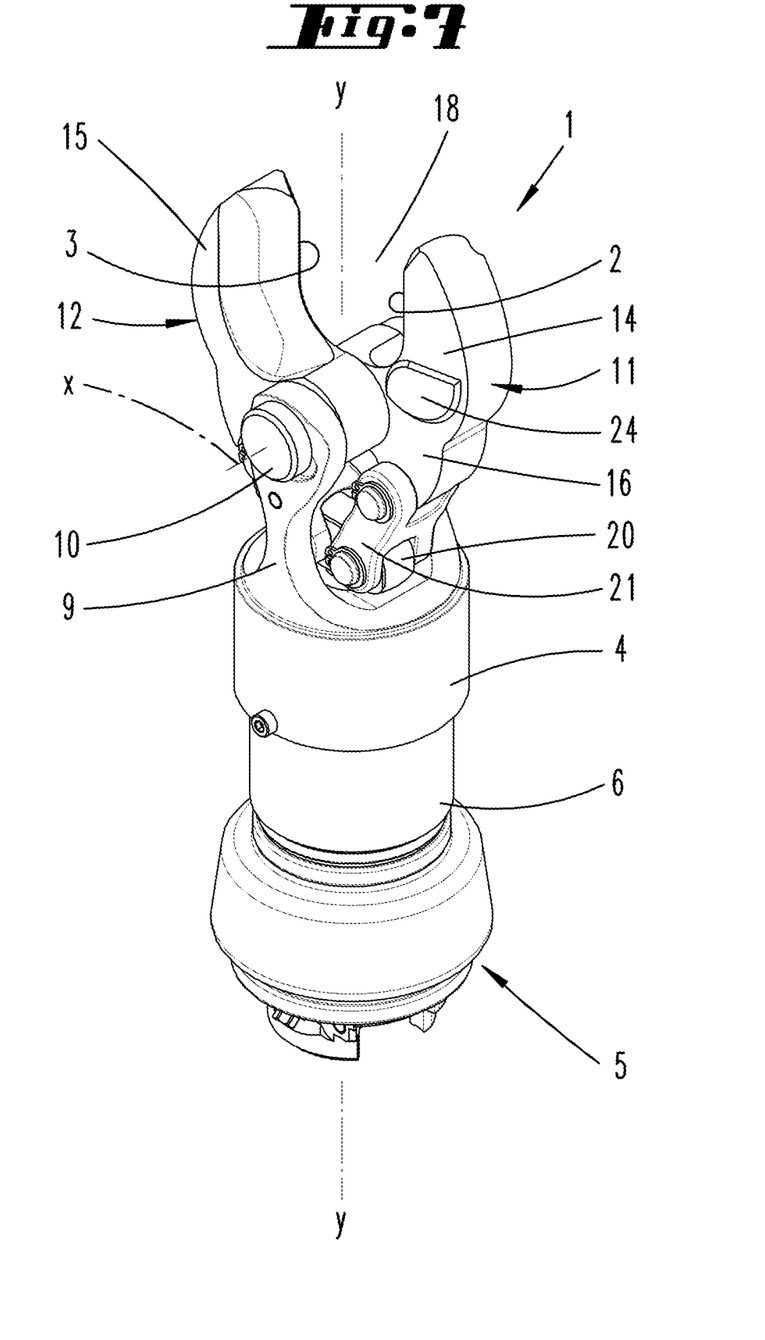
FIG. 7 shows a representation that corresponds to FIG. 1 and concerns a second embodiment.
Figure 8:
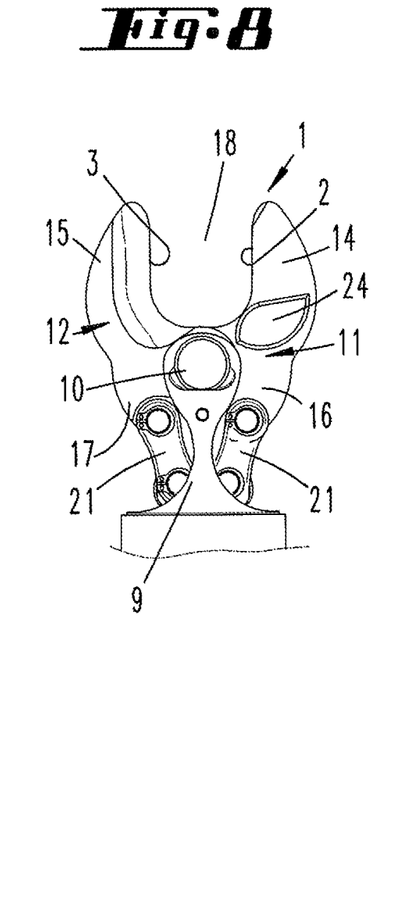
FIG. 8 shows a representation that corresponds to FIG. 2 and concerns the embodiment according to FIG. 7.
Figure 9:
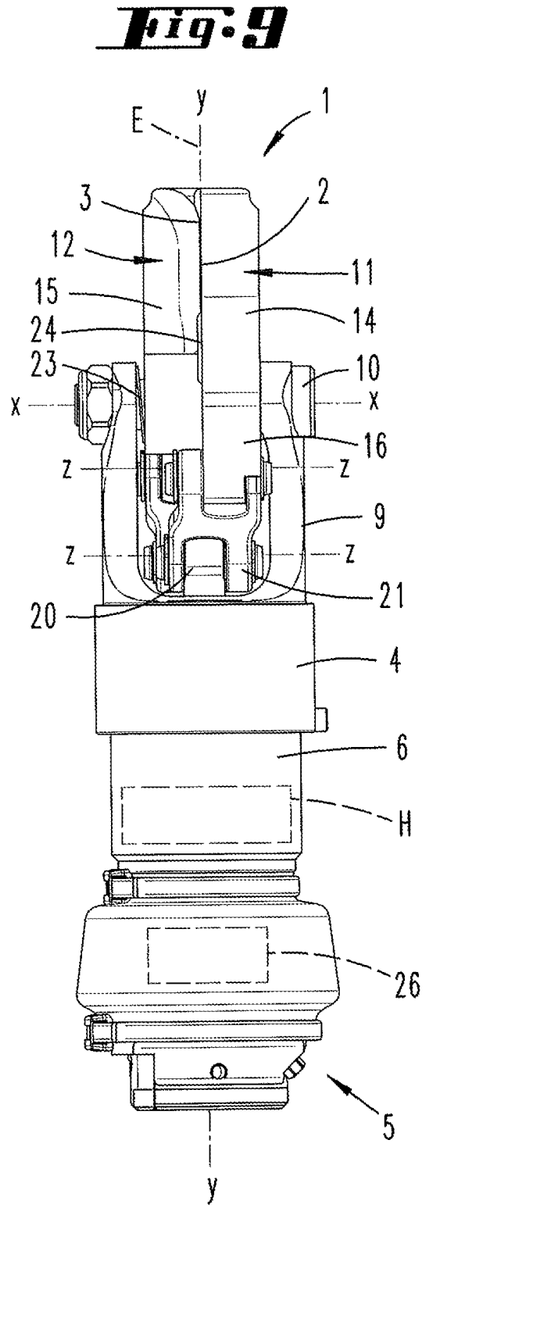
FIG. 9 shows a corresponding side view.
Figures 10, 11:
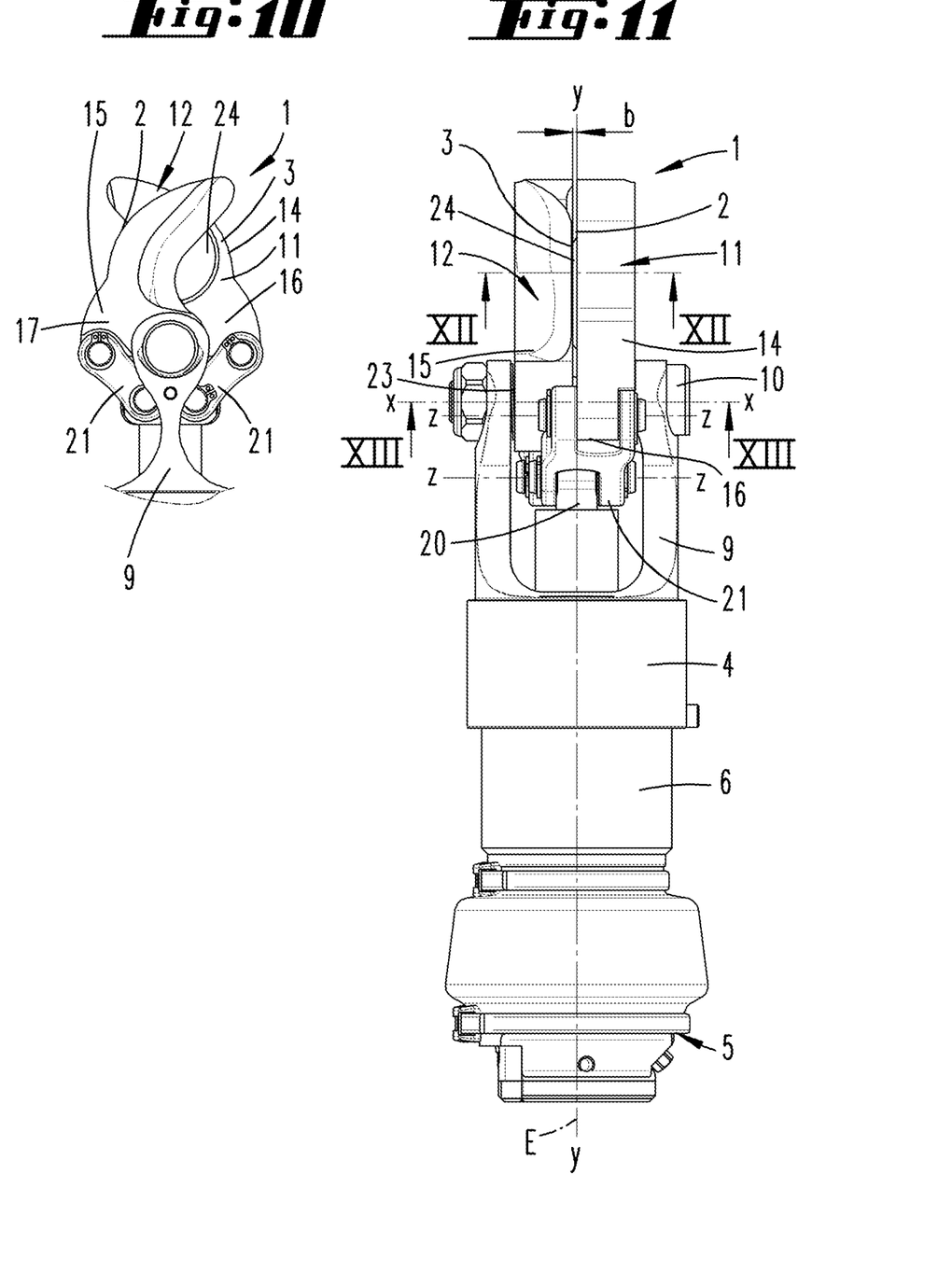
FIG. 10 shows a representation that corresponds to FIG. 8 and concerns the closed position of the shears.
FIG. 11 shows a corresponding side view.
Figure 12:
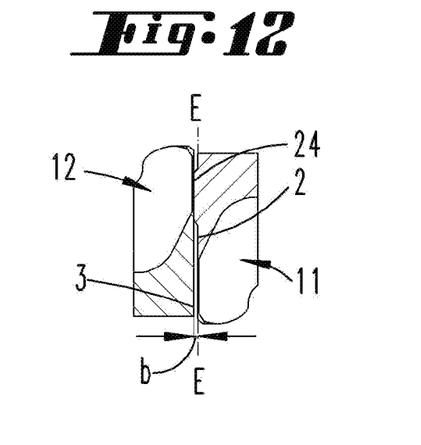
FIG. 12 shows the section along the line XII-XII in FIG. 11.
Figure 13:
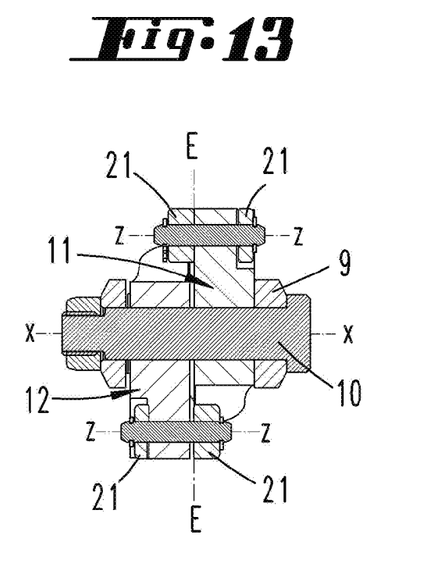
FIG. 13 shows the section along the line XIII-XIII in FIG. 11.
Figure 14:
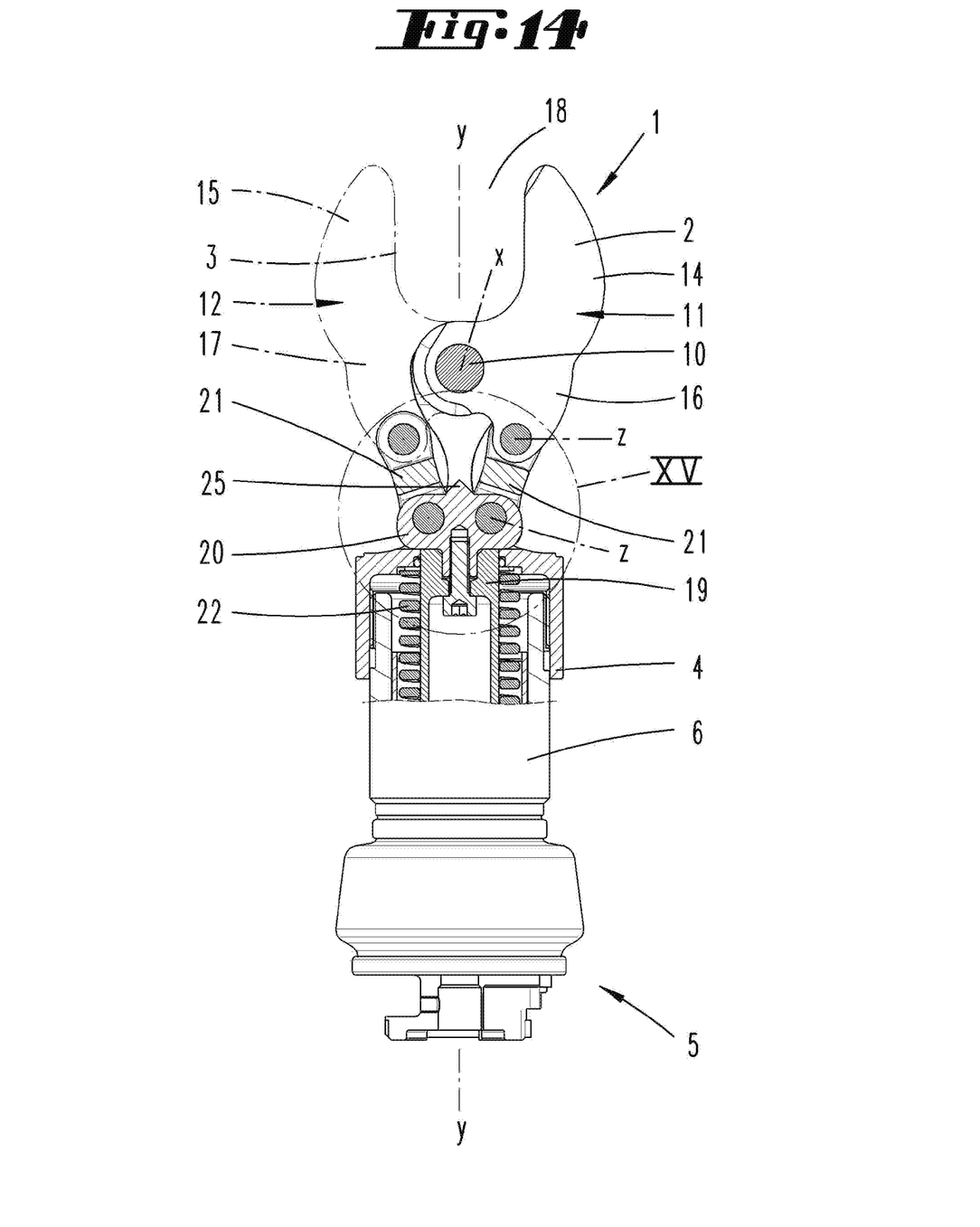
FIG. 14 shows a sectional representation that corresponds to FIG. 6 and concerns another embodiment.
Figure 15:
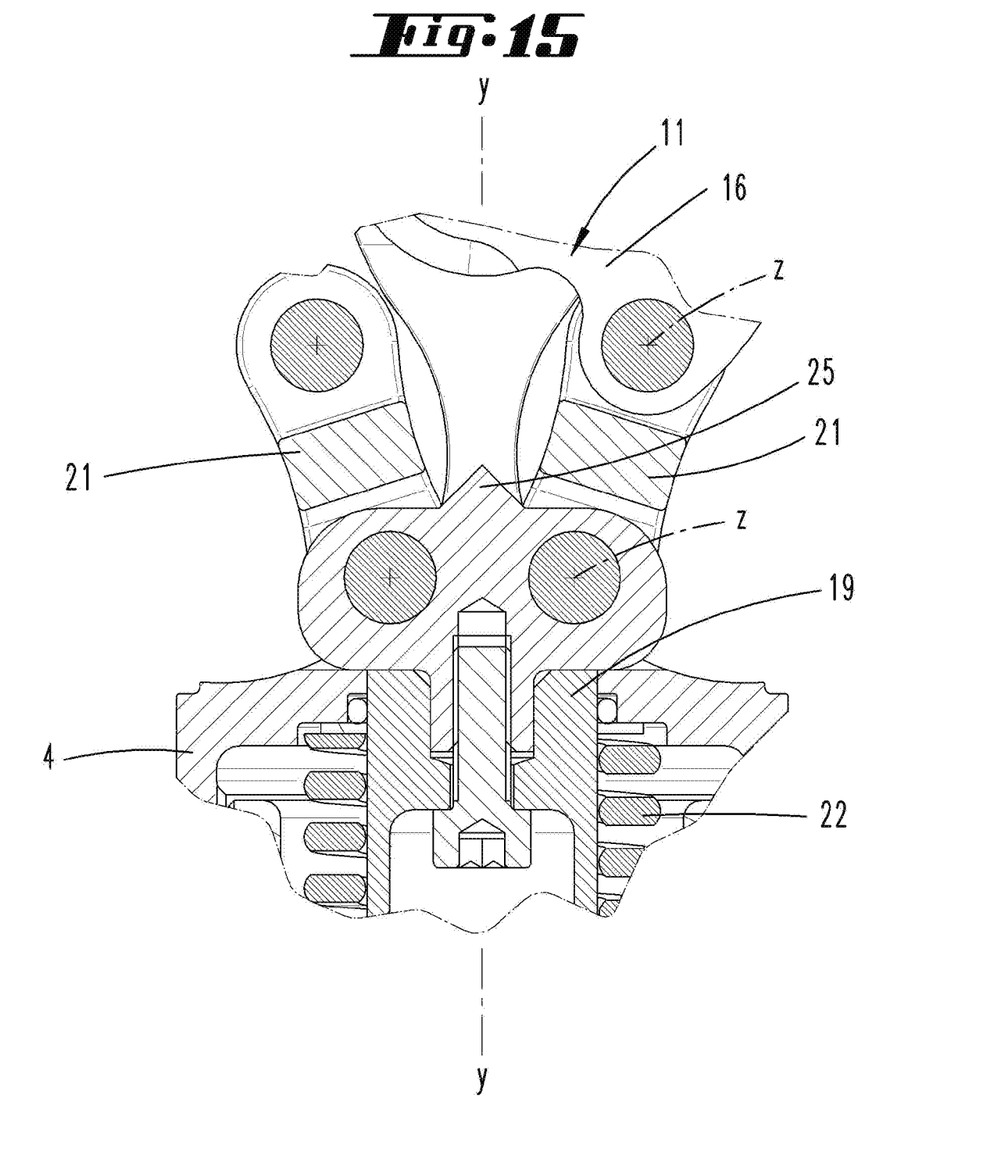
FIG. 15 shows an enlarged representation of the region XV in FIG. 14.
Figure 16:
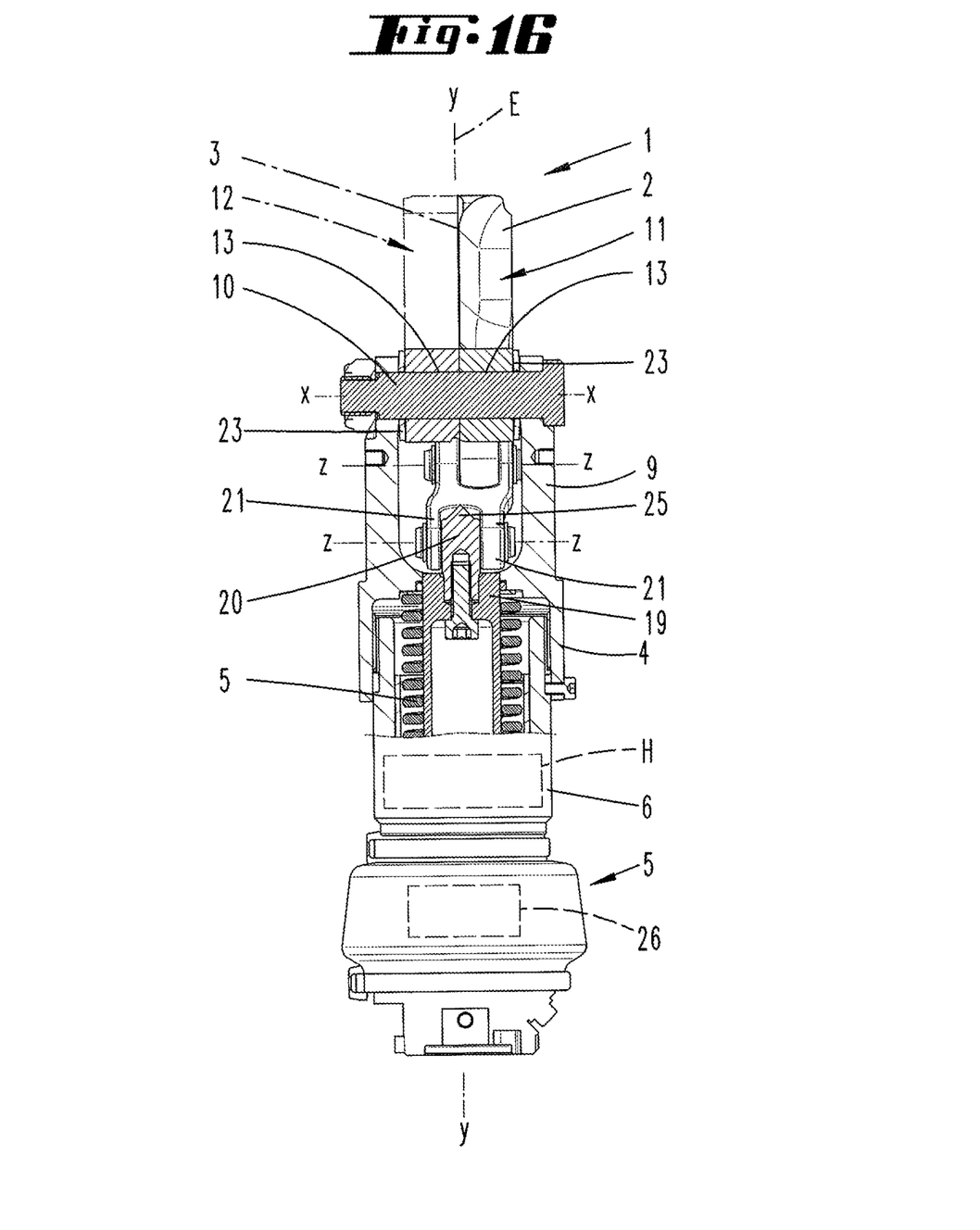
FIG. 16 shows the section along the line XVI-XVI in FIG. 14.
Figure 17:
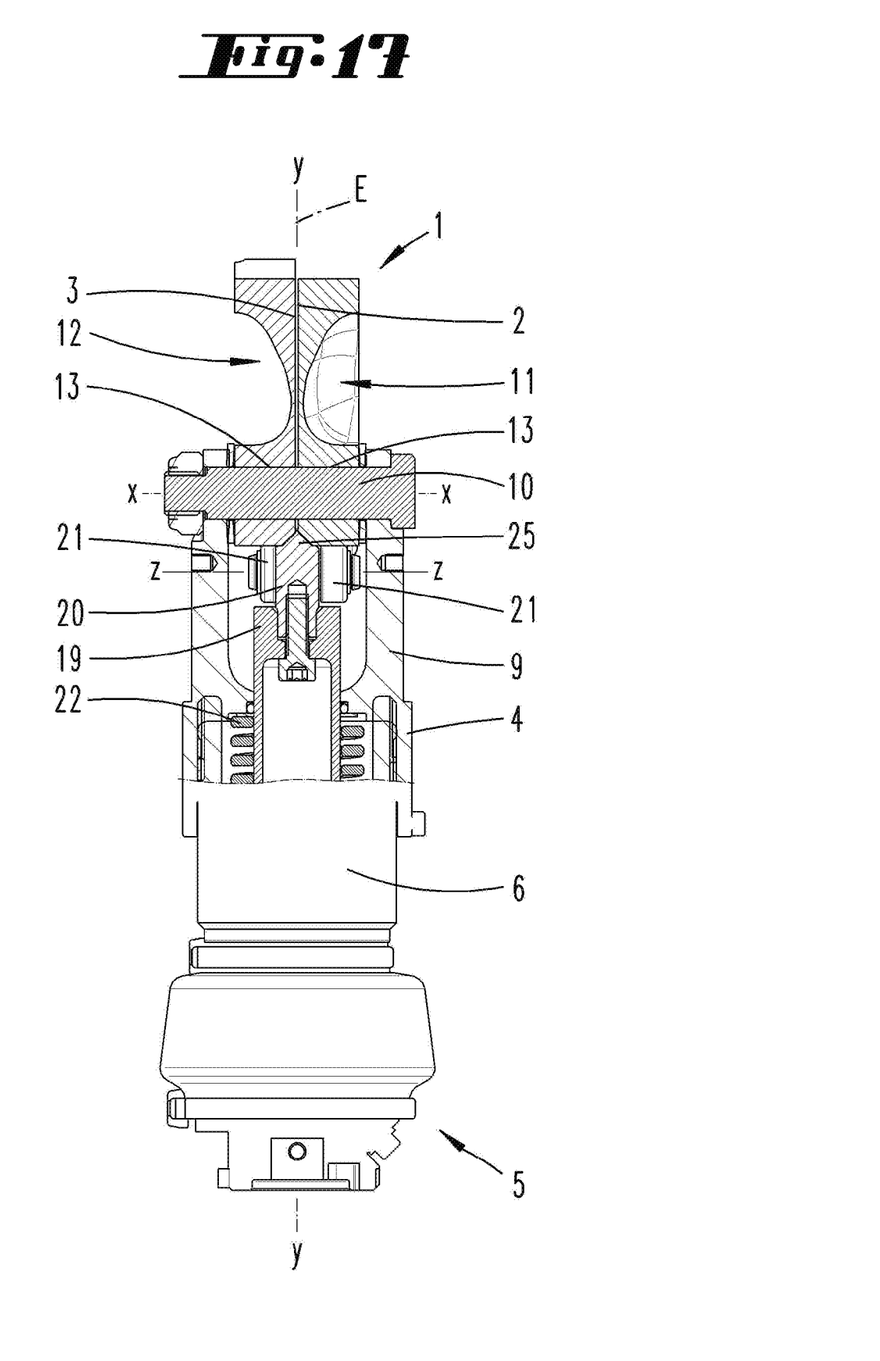
FIG. 17 shows a sectional representation that corresponds to FIG. 16 and concerns the closed position of the shears.

Since the rotational axis x extends along an arc under this load and the axle body 10 is correspondingly bent, the blades 2 and 3, particularly the cutting jaws 14 and 15 featuring the blades 2 and 3, are respectively spread apart starting from the rotational axis x or starting from the axle body 10 (see FIG. 5). In this case, the angle α being adjusted between the facing cutting surfaces may amount to a few tenths of a degree, e.g. from 0.5° up to 2 or 3°.

It is preferred, but not absolutely imperative, that the facing surfaces of the cutting jaws 11 and 12 include identical acute angles with the cutting plane E.

Figure 4:
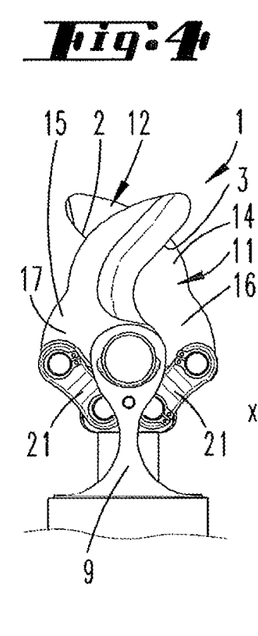
FIG. 4 shows a representation according to FIG. 2 that concerns the closed position of the shears.

At the conclusion of the cutting process (which is also illustrated in FIGS. 4 and 6), the piston 8 returns into its home position with the assistance of the force of the relaxing return spring 22, if applicable automatically or alternatively in response to a user command. As the return movement of the piston 8 begins, the axle body 10 is no longer acted upon by the plunger such that the axle body 10 is due to the elastic properties of the chosen material automatically returned into a position, in which the rotational axis x is once again straight and aligned perpendicular to the cutting plane E. It is preferred that the cutting jaw surfaces once again abut on one another in this position.

Alternatively or additionally to spreading apart the blades 2 and 3 as described above, the blades 2 and 3 may also be spaced apart from one another in a parallel manner toward the end of the cutting process.

An exemplary embodiment, which pertains exclusively to such a parallel spacing, is illustrated in FIGS. 7-11.

According to these figures, the cutting jaws 11 and 12 may be mounted on the axle body 10 in such a way that at least one of the cutting jaws 11, 12 can be slightly displaced between the U-limbs of the bracket 9 along the rotational axes x, particularly by a few tenths of a millimeter, for example between 0.5 mm and up to 2 or even 3 mm.

The occurring play in the axial direction is bridged with an intermediately arranged spring 23 that acts upon one cutting jaw 11 in the direction of the other cutting jaw 12.

This spring may encompass the axle body 10 and be supported on the inner wall of the facing U-limb of the bracket 9 with one end while its other end acts upon the facing surface of the region of the respective cutting jaw 11 or 12 surrounding the bore 13.

This spring may consist, e.g., of a strong disk spring or even a snap ring or the like.

An elevation 24 may be integrally formed on one of the two facing surfaces of the cutting arms 14 or 15 that slide past one another during the course of a cutting process, wherein said elevation can preferably extend from the surface beyond the cutting plane E. According to the illustration in FIG. 8, this elevation may represent a surface with a leading run-up slope in the cutting direction. In this respect, it would also be conceivable to provide multiple elevations 24, e.g. in the form of ribs, over the surface of the cutting arm 14 or 15.

Toward the end of a cutting process, the cutting jaw that interacts with the cutting jaw featuring the elevation 24 is axially displaced along the rotational axis x and therefore spaced apart from the opposite blade (see FIG. 11) as a result of the cutting surface running up on the elevation 24. The axial displacement takes place against the restoring force of the spring 23.

A gap dimension b, which corresponds to the height of the elevation 24 transversely to the cutting plane E, may be adjusted in this case.

In this embodiment, the load upon the one cutting jaw is also discontinued during the course of the return movement of the blades such that the cutting jaw 11 is returned into its home position, in which both blades 2 and 3 intersect one another in the cutting plane E, due to the relaxation of the spring 23.

FIGS. 14-17 show another embodiment, in which both cutting jaws, 11, 12 are spaced apart parallel to one another in the final cutting position due to a displacement of the cutting jaws out of the cutting plane E along the axle body 10.

This can be achieved as shown by acting upon the blades 2, 3 or cutting jaws 11, 12 directly by means of the plunger 19 or the tab 20 fixed on the plunger 19. To this end, said tab preferably features an extension 25 that freely protrudes beyond the tab 20 coaxial to the axis y. This extension 25 is preferably realized in the form of a pointed cone. Due to the chosen arrangement, the point of the extension 25 extends in the cutting plane E.

Toward the end of the cutting process, the pointed region of the extension encounters facing marginal edges of the cutting jaws 11 and 12 in the cutting plane E. These corresponding marginal edge regions may be beveled and thereby adapted to the incline of the conical extension surface (see FIG. 17).

Due to the axial displacement of the extension 25 on the tab side, the blades 2, 3 or the cutting jaws 11, 12 are respectively pushed in opposite directions, namely against the force of the spring 23 between the cutting jaw 11, 12 and the bracket 9, which causes the return of the cutting jaws, 11, 12 into the abutting position. The extension 25 preferably acts uniformly upon the cutting jaws 11 and 12 in a wedge-like manner.

The arrangement of such an extension 25 also makes it possible to displace only one cutting jaw 11 or 12 while the other cutting jaw is immovably held in the abutting position with respect to its alignment in the direction of the rotational axis.

The facing surfaces of the cutting jaws 11 and 12 preferably always extend parallel to one another.

The preceding explanations serve for elucidating all inventions that are included in this application and respectively enhance the prior art independently with at least the following combinations of characteristics, wherein two, multiple or all of these combinations of characteristics may also be combined, namely:

Motor-operated shears 1, which are characterized in that the blades 2, 3 are toward the end of the movement acted upon in a direction extending transversely to the movement in order to space the blades 2, 3 apart from one another in this direction.

Shears, which are characterized in that the blades 2, 3 are acted upon so as to be spread apart starting from a rotational axis x of the blades 2, 3.

Shears, which are characterized in that the blades 2, 3 are acted upon over their length in order to be spaced apart in a parallel manner.

Shears, which are characterized in that the blades 2, 3 are acted upon in a superimposed manner in order to be spread and spaced apart parallel to one another.

Shears, which are characterized in that the blades 2, 3 are rotatably mounted on a common axle body 10, and in that the axle body 10 can be acted upon in order to space apart the blades 2, 3.

Shears, which are characterized in that the axle body 10 can be bent in order to space apart the blades 2, 3.

Shears, which are characterized in that the blades 2, 3 are acted upon by means of a plunger 19 that can be extended in a motor-driven manner by a motor 26, if applicable with the aid of a hydraulic medium H acting on the piston 8.

Shears, which are characterized in that the plunger 19 is designed for acting upon the axle body 10.

Shears, which are characterized in that the plunger is designed for directly acting upon the blades 2, 3.

Shears, which are characterized in that the blades 2, 3 are driven by the plunger 19 via connecting rods 21 in order to carry out a shearing movement.

All disclosed characteristics are essential to the invention (individually, but also in combination with one another). The disclosure content of the associated/attached priority documents (copy of the priority application) is hereby fully incorporated into the disclosure of this application, namely also for the purpose of integrating characteristics of these documents into claims of the present application. The characteristic features of the dependent claims characterize independent inventive enhancements of the prior art, particularly for submitting divisional applications on the basis of these claims.

LIST OF REFERENCE SYMBOLS

1 Shears
2 Blade
3 Blade
4 Flange
5 Base unit
6 Neck
7 Cylinder
8 Piston
9 Bracket
10 Axle body
11 Cutting jaw
12 Cutting jaw
13 Bore
14 Cutting arm 15 Cutting arm
16 Actuating arm
17 Actuating arm
18 Cutting opening
19 Plunger
20 Tab
21 Connecting rod
22 Return spring
23 Spring
24 Elevation
25 Extension
26 Motor
a Offset dimension
b Gap dimension
x Rotational axis
y Axis
z Rotational axis
E Cutting plane
α Angle

The invention claimed is:

1. Shears comprising:
a base unit;
an axle body mounted on the base unit;
first and second jaws pivotally mounted on the axle body which defines a first axis, each jaw having a blade thereon, wherein a cutting plane is defined between the jaws, the jaws being movable relative to one another around the first axis and along the cutting plane in order to carry out a shearing movement;
a plunger mounted on the base unit;
a linkage coupling the plunger to the first and second jaws; and
a motor configured to move the plunger, the linkage and the jaws in order to carry out the shearing movement and to further move the linkage into engagement with the first and second jaws to bend the axle body, thereby causing the blades to space apart from one another in a direction transverse to the cutting plane.

2. The shears according to claim 1, wherein the blades are at an angle relative to each other when spaced apart.

3. The shears according to claim 1, further comprising a bracket mounted on the base, the axle body extending through first and second limbs of the bracket with the first and second jaws being mounted between the first and second limbs, the first jaw being in engagement with the first limb; and a spring positioned between the second limb and the second jaw and exerting a force thereon, wherein when the axle body is bent, the blades are parallel to each other when spaced apart by the spring exerting the force on the second jaw.

4. The shears according to claim 1, wherein the linkage comprises at least one tab on the plunger and connecting rods rotatably connected to the at least one tab and to the jaws, wherein the at least one tab engages the axle body, and wherein the plunger and the at least one tab are configured to move the connecting rods in order to affect the shearing movement.

5. The shears according to claim 4, wherein the at least one tab is separately formed from the plunger and connected to the plunger.

6. Shears comprising
a base unit;
an axle body mounted on the base unit;
first and second jaws pivotally mounted on the axle body which defines a axis, each jaw having a blade thereon, wherein a cutting plane is defined between the jaws, the jaws being movable relative to one another around the axis and along the cutting plane in order to carry out a shearing movement;
a plunger mounted on the base unit;
a linkage coupling the plunger to the first and second jaws; and
a hydraulic medium in the base unit which is configured to act upon the plunger to move the plunger, the linkage and the jaws relative to the base unit in order to carry out the shearing movement and further move the linkage into engagement with the first and second jaws to bend the axle body, thereby causing the blades to space apart from one another in a direction transverse to the cutting plane.

7. The shears according to claim 6, wherein the blades are at an angle relative to each other when spaced apart.

8. The shears according to claim 6, further comprising a bracket mounted on the base, the axle body extending through first and second limbs of the bracket with the first and second jaws being mounted between the first and second limbs, the first jaw being in engagement with the first limb; and a spring positioned between the second limb and the second jaw and exerting a force thereon, wherein when the axle body is bent, the blades are parallel to each other when spaced apart by the spring exerting the force on the second jaw.

9. The shears according to claim 6, wherein the linkage comprises at least one tab on the plunger and connecting rods rotatably connected to the at least one tab and to the jaws, wherein the at least one tab engages the axle body, and wherein the plunger and the at least one tab are configured to move the connecting rods in order to affect the shearing movement.

10. The shears according to claim 9, wherein the at least one tab is separately formed from the plunger and connected to the plunger.

* * * * *